Nov. 9, 1971  G. V. ROCH  3,618,349
GAUGING SYSTEM FOR PRESSES

Filed March 26, 1969  3 Sheets-Sheet 1

INVENTOR
GERALD V. ROCH
BY
Woodard, Weikart, Emhardt & Naughton
Attorneys

Nov. 9, 1971  G. V. ROCH  3,618,349
GAUGING SYSTEM FOR PRESSES
Filed March 26, 1969  3 Sheets-Sheet 2

INVENTOR
GERALD V. ROCH
BY
Woodard, Weikart, Emhardt & Naughton
Attorneys

Nov. 9, 1971  G. V. ROCH  3,618,349
GAUGING SYSTEM FOR PRESSES
Filed March 26, 1969  3 Sheets-Sheet 3

INVENTOR
GERALD V. ROCH
BY
Woodard, Weikart, Emhardt & Naughton
Attorneys

United States Patent Office 3,618,349
Patented Nov. 9, 1971

3,618,349
GAUGING SYSTEM FOR PRESSES
Gerald V. Roch, Indianapolis, Ind., assignor to Hurco
Manufacturing Company, Inc., Indianapolis, Ind.
Filed Mar. 26, 1969, Ser. No. 810,697
Int. Cl. B21b 37/12
U.S. Cl. 72—8                                    18 Claims

ABSTRACT OF THE DISCLOSURE

Two gauge assemblies mounted in front of the forming tools of a press brake, and two assemblies in back of the forming tools, incorporate pneumatic cylinders to drive gauge carriages facilitating automatic programmed control and positioning of gauges. The front gauge cylinders are hydraulically slave to each other, as are the rear gauge cylinders for synchronized movement, with flow control for rate of movement, and chain and sprocket coupling of cylinders to gauge carriages for travel multiplication. Control of the gauges is accomplished by means of a rotary encoder mounted on one gauge housing of both the front and rear units which is constantly measuring the position of the gauge in use thru electrical impulses generated in direct proportion to the gauge travel and sent to a digital electronic controller that employs counting circuits to shut off solenoid valves in the gauge assemblies when coincidence is reached with the desired pre-selected gauge dimensions.

BACKGROUND OF THE INVENTION

Field of the invention

This invention relates generally to gauging systems for presses, and more particularly to a system particularly well adapted to provide front gauges and back gauges for press brakes.

Description of the prior art

Press brakes having front and back gauges are well known and widely used. Unfortunately, however, they are not particularly convenient to adjust, and none of them can change position for various bends in sequence in a part forming cycle. As a step in an effort to save set-up time, a front-operated-back-gauge adjustment is known in the art and includes a front-operated handle with an associated indicator register for reading gauge adjustment in inches and sixty-fourths. Such equipment has been offered by the Dreis and Krump Manufacturing Company of Chicago for their series "D" mechanical press brakes.

A further step in gauging systems is a magnetic tape control system for operating the back of guillotine-type paper cutting machines. Such a structure is shown in the U.S. Pat. 3,245,556 to Thumin. Another patent dealing with this subject matter is 3,176,556 to Roberts. A patent, 3,165,140, to Hazelton deals with multiple stop means for press brakes, capable of automatic control by a stepping relay, but pertains to ram operation rather than front or back gauges. A patent, 2,069,536, to Palmer discloses an automatic gauging stop for shearing machines, having an eccentrically mounted stud for automatic adjustment for the stop. Patent 2,006,765 to T. O. Hudson discloses a system for adjustment of a rolling mill screw to provide the proper gauge for successive passes.

Typical press brake practice has been to set up for a first bend, make the first bend on each part of a production run, then set up again for the next bend, make the second bend, set up again, and so on until the run is finished.

There has remained a need for reduction in both set-up time, operation time, and material handling in manufacturing operations, particularly in press work. The present invention is intended to meet that need by making it possible, with many sizes and shapes of parts, to form a part complete before it is ever laid down.

SUMMARY OF THE INVENTION

In a typical embodiment of the present invention, a press brake is provided with two gauge assemblies in front of the forming tools (front gauge assemblies), and two gauge assemblies behind the forming tools (back gauge assemblies). Each of these assemblies is very much like the others and includes a gauge carriage linearly moveable in (toward) and out (away from) the forming tools. The gauge carriage is connected by appropriate means to a drive cylinder linearly moveable in and out by application of fluid pressure. The cylinders for the two front gauges are slave to each other for operation in unison, as are the cylinders for the back gauges, externally applied fluid pressure differentials determining the direction of movement of the gauge carriages by the cylinders. Gauge movement rate controls are provided in hydraulic fluid passageway means between the two cylinders on a given side of the press brake. A control unit is provided so that operator can dial in positions for the front and rear gauges in a desired sequence, the steps of the sequence being coordinated with the press brake cycle.

BRIEF DESCRIPTION OF THE DRAWING

The full nature of the invention will be understood upon reading the following description and considering the accompanying drawing wherein.

DESCRIPTION OF THE PREFERRED EMBODIMENT

Figure 1:
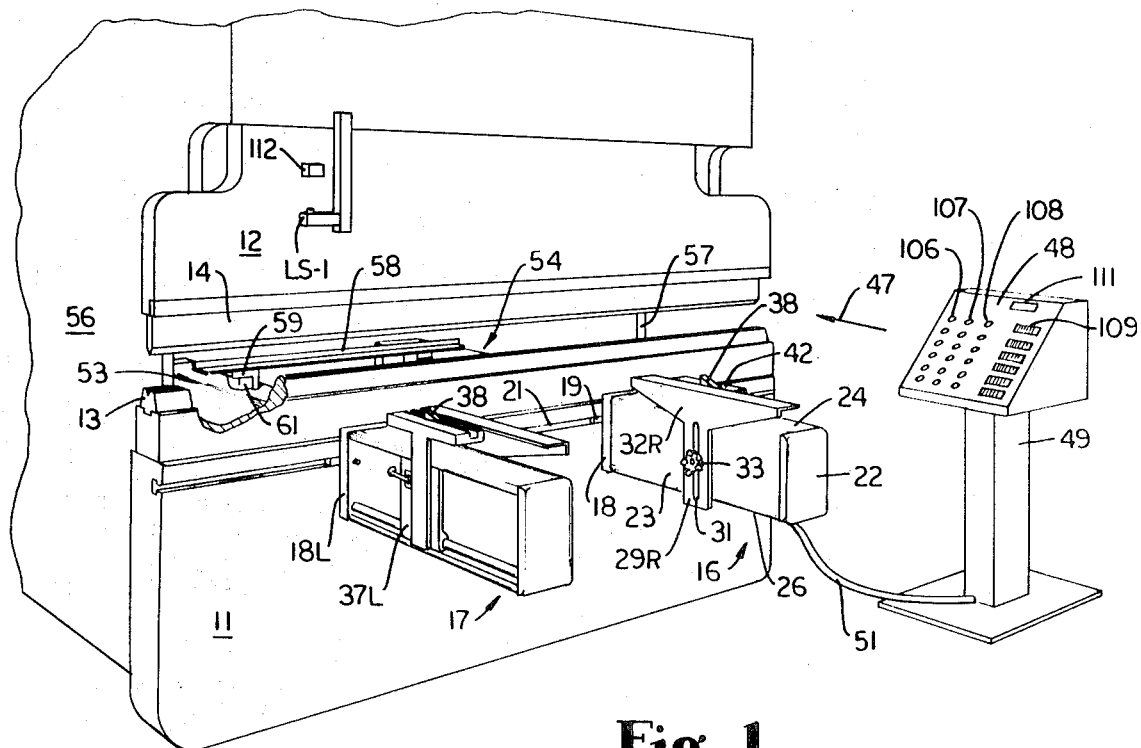
FIG. 1 is a perspective view of a press brake incorporating a gauging system according to a typical embodiment of the present invention.

Referring now to the drawings in detail, the press brake bed and press brake ram are shown at 11 and 12, respectively, with a forming tool 13 at the top of the bed and forming tool 14 at the bottom of the ram. Two gauge assemblies 16 and 17 are mounted to the front of the bed, and because they are virtually identical in construction, a description of one should suffice for both.

Referring to gauge assembly 16, the main housing support plate 18 at the back end thereof is bolted to a slide 19 received in the slideway 21 of the press brake bed. The other end plate 22 is supported in horizontally spaced relationship to the plate 18 by upper and lower carriage guide rods 27U and 27L, respectively, mounted in plate 18 and hidden from view in FIG. 1 by the side housing closure 23. Top and bottom housing wall closures 24 and 26, respectively, are affixed to the end plates, as is the side closure 23. The piston rod 28 is also affixed to both end plates.

The side wall 23 of the gauge housing provides a convenient support for column 29R providing the support for the right-hand front stock support member 32R. The column or post 29R is received in a vertically extending groove in the face of the sidewall 23 of the housing. It has a vertically extending slot 31 therein receiving a clamp bolt with a clamp knob 33 thereon securing the post and thereby the right-hand stock support 32R in the desired vertical position.

Figure 2:
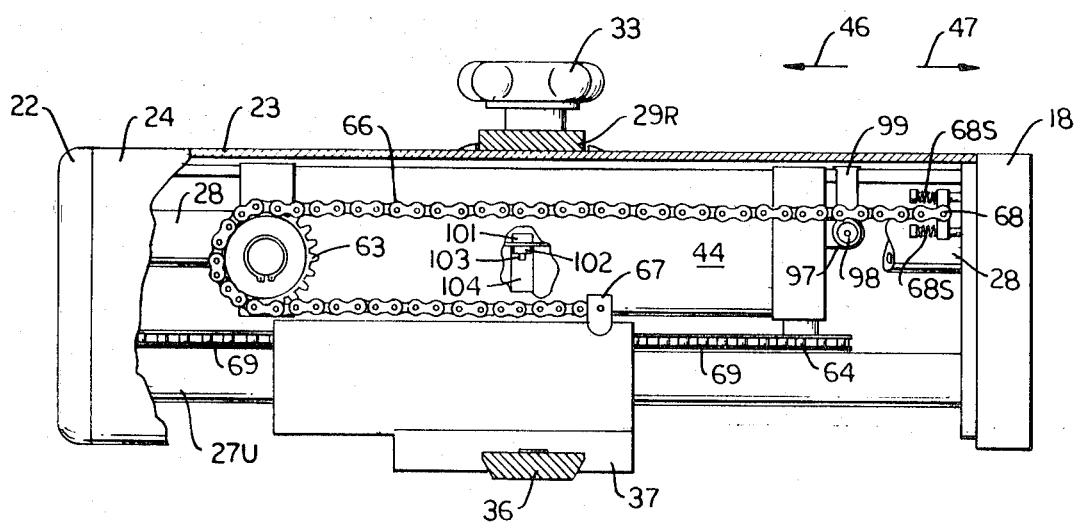
FIG. 2 is an enlarged top plan view, partially in section, of one of the gauge assemblies according to a typical embodiment.
Figure 3:
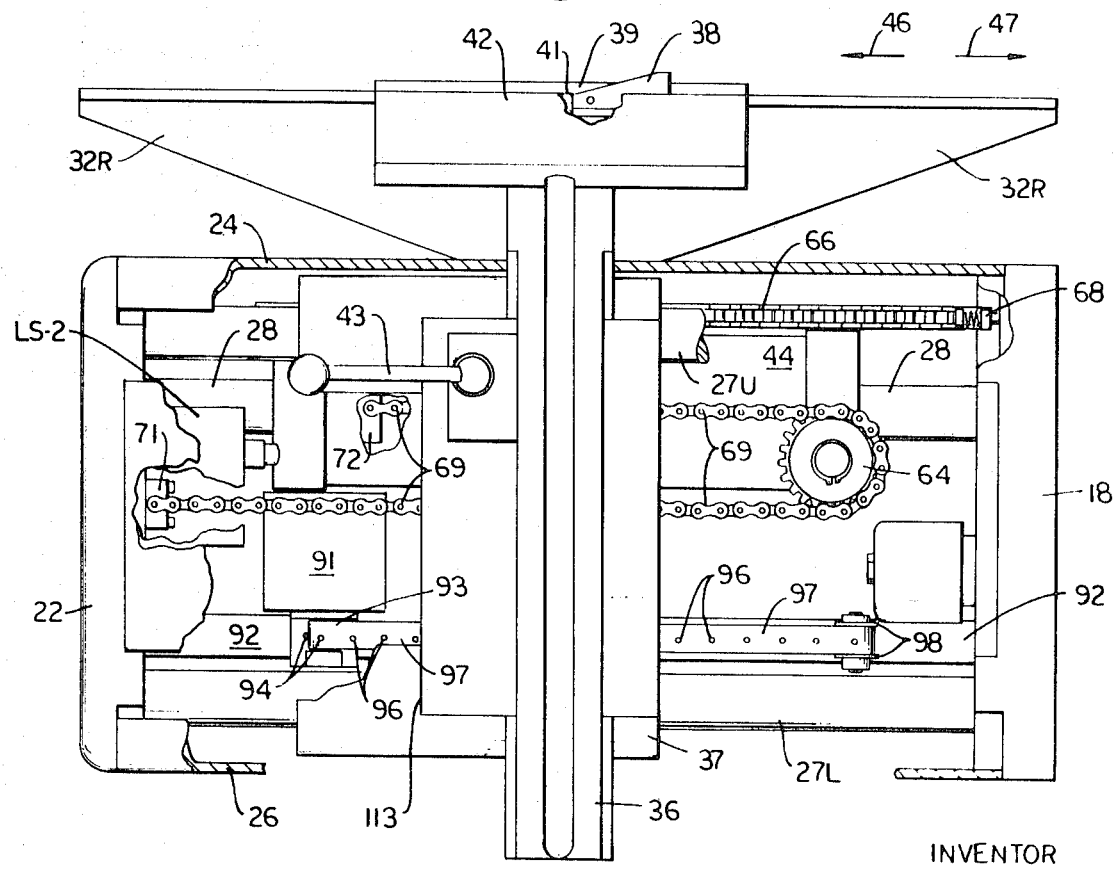
FIG. 3 is a side elevational view of one of the gauge assemblies at the same scale as FIG. 2, and illustrating the travel sensor and the coupling of the drive cylinder to the gauge carriage.

Referring more specifically to FIGS. 2 and 3, a post 36 is received in a vertically extending groove in a carriage member 37, the latter having its lower and upper ends guidingly received on the lower and upper guide rods 27L and 27U respectively. To assure friction-free reciprocating movement of the carriage on the rods, Thompson recirculating ball bushings may be used. A disappearing stop 38 is pivotally mounted on a slide 39 received in the longitudinally extending slot 41 in the gauge support 42 at the top of post 36. The vertical height of the gauge and its support can be changed by sliding the post 36 vertically in its mounting groove upon loosening the lock handle 43.

A cylinder 44 of a linear actuator assembly is mounted on the piston rod 28, the latter extending through both ends of the cylinder and being affixed at its opposite ends to the end plates of the gauge housing. This cylinder serves to retract the carriage in the direction of arrow 46, and advance the carriage in the direction of arrow 47, in a manner and by means which are to be described hereinafter.

For automatic sequencing of the drive of the gauges, an appropriate control console 48 (FIG. 1) is mounted on a predestal 49 adjacent to the front of the press brake bed and is coupled to the press brake and gauge assemblies by various conductors which may be disposed in the conduit 51. This control is intended not only for the front gauge assemblies 16 and 17, but also for the left back gauge assembly 53 and right back gauge assembly 54, a portion of the former being hidden behind the left-hand side frame 56 of the press brake, the right-hand side frame of the press brake being at 57. Although the rear gauge fingers 58 and the supports thereor 59 are of slightly different configuration than those for the front gauges, the mountings of the posts 61 therefor to the gauge assemblies and housings herein are the same as for the front gauges, and so is their operation the same.

Referring again to FIGS. 2 and 3 wherein part of the housing is omitted and part of the upper guide rod 27U is omitted from FIG. 2, it should be noted that the cylinder 44 has a drive wheel in the form of a sprocket 64 and return wheel in the form of a sprocket 63 mounted thereon for rotation on axes having fixed locations relative to the cylinder. A force transmitting connector strand in the form of a chain 66 is passed around sprocket 63 and connected at one end to the gauge carriage at 67 and has its other end connected to the gauge assembly end plate 18 at the spring loaded anchor 68 the springs 68S urging the anchor toward plate 18. A connector starnd in the form of chain 69 connected at one end to the plate 22 at anchor 71, passes around sprocket 64 and is connected to carriage 37 at the other end 72. The purpose of the sprockets and chains is so that one inch of cylinder travel in the direction of arrow 46 or arrow 47 will result in two inches of gauge travel in the same direction as cylinder travel.

Figure 4:
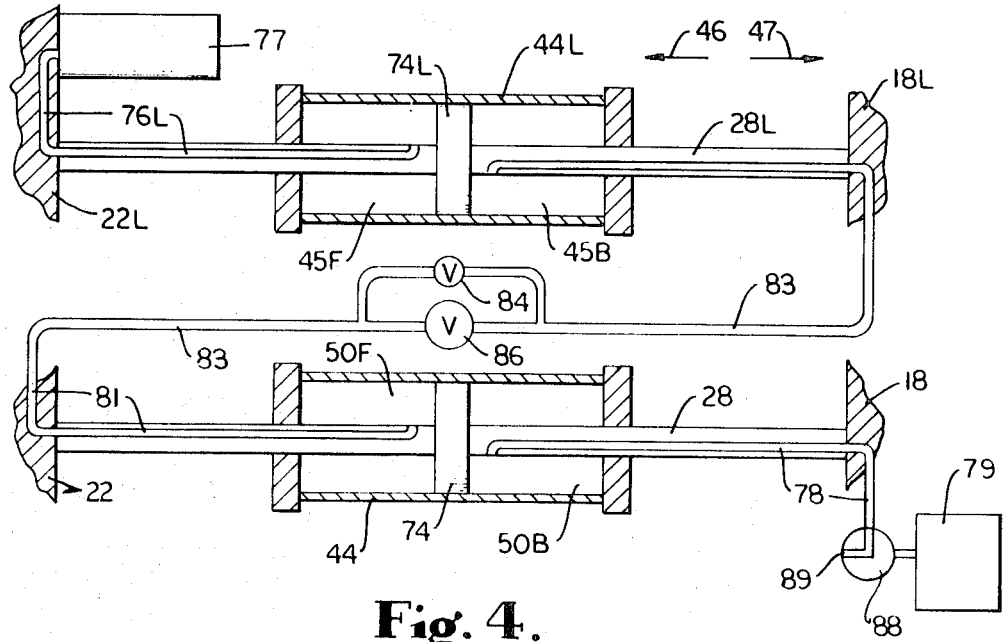
FIG. 4 is a schematic diagram of the drive cylinders on two of the front gauges, illustrating their slave relationship.

Referring now to FIG. 4, the cylinder 44 for the gauge assembly 16 is shown, together with its connection to the cylinder 44L of the gauge assembly 17, to illustrate the interconnection between the two, as well as their mode of operation. Note that cylinder 44L is mouned to a piston rod 28L, the ends of which are secured to the gauge assembly housing end plates 18L and 22L. The piston 74L is secured to the piston rod which is ported to provide several passageways therethrough. A passageway 76L is provided from chamber 45F through the ported piston rod and end plate 22L communicating with a supply of air at around fifty pounds per square inch pressure in surge tank 77. In cylinder 44, chamber 50B behind the piston 74 is supplied with air through passageway 78 from a source at one hundred pounds per square inch pressure, for example, designated schematically at 79. Although the rear chamber 50B of cylinder 44 is coupled to an air supply, and the front chamber 45F of the cylinder 44L is coupled to a surge tank, the front chamber 50F of cylinder 44 is connected through passageways 81 including the ported piston rod and a hydraulic hose 83 to the rear chamber 45B of cylinder 44L. A two-way valve 84 and a two-way valve 86 are connected in parallel, this parallel combination being in series in the line 83 between the ends of the cylinders.

To advance the front gauges in the direction of arrow 47 toward the forming tools, it is necessary that there be a difference in pressure between chamber 50B and 50F of cylinder 44, with the higher pressure in chamber 50B. This can be accomplished by opening valve 88 to provide one hundred pound per square inch air supply from source 79 to the chamber 50B. Line 76L is always open to the gauge tank 77. The condition of the valves 84 and 86 will determine the rate of movement of the cylinders, because the hydraulic fluid moved from chamber 50F through passageway 83 into chamber 45B must pass through one or both valves, depending upon their condition. For high speed movement, both valves 84 and 86 are open permitting parallel passage of hydraulic fluid therethrough. For low speed movement, valve 86 is closed, permitting hydraulic fluid to pass only through valve 84. When movement of the gauge is to be terminated, valve 84 is closed whereupon movement of both cylinders terminates in spite of application of pressure to one or the other of the cylinders from the air sources. By blocking both the valves 84 and 86, accurate control of positioning of the front gauges is obtained.

If valve 88 is switched to a position venting chamber 50B through the vent port 89, the pressure in the surge tank source 77, being applied continuously to chamber 45F will initiate outward movement of the cylinders, and gauges therewith, upon opening one or the other of the valves 84 and 86. Normally, both valves would be opened first for rapid movement of the gauges, followed by closure of valve 86 while valve 84 remains open for incremental movement of the cylinders and gauges until stopped by closure of valve 84.

The same master-slave relationship is provided between the hydraulic cylinders 144 and 144L of the back gauge assemblies 53 and 54 facilitating the rapid, convenient and accurate control and location thereof. It also facilitates the provision of automatic controls therefor.

Various means might be employed for directly sensing location of the gauge with respect to a reference line or plane at the press brake forming tools or a reference line at some other location. It is also possible to determine the location by establishing a gauge reference position at a known location with respect to the reference line, and noting the distance the gauge moves from the reference position. The latter approach can be simpler and less expensive than the former and is used in the illustrated embodiment of this invention.

For the front gauges, the reference position is at the limit of their retraction. The distance the gauges are moved therefrom by the linear actuators is detected by use of apparatus incorporating additional features of the present invention.

Referring to FIG. 3, a rotary encoder 91 is mounted to a bracket 92 affixed by suitable mounting means to end plate 22. An example is the DRC-77 shaft angle digitizer of the Dynamics Research Corporation of Stoneham, Mass. Instead of using a precision gear rack and pinion with the encoder, another feature of this invention is to provide a pulley 93 on the encoder with a plurality of studs 94 precisely formed and circularly spaced thereon and received in precisely formed and linearly spaced apertures 96 in a flexible non-stretchable loop in the form of a metal band 97. An idler pulley 98 is mounted to bracket 99 affixed by suitable means to end plate 18. It receives the band 97. The ends of the band are clamped together between a tape clamp base 101 and clamp 102 secured thereto by screw 103. The base 101 is at the outer end of arm 104 affixed to the carriage 37 near the lower guide rod 27L. Accordingly the carriage movement causes the band to move around the pulleys whereupon the encoder produces a pulse output; the number of pulses being directly related to the distance the carriage moves.

Referring back to FIG. 1, the front panel of console 48 is arranged to be capable of a six step sequence of operations in a part forming cycle. It includes six, two-position gauge selecting switches 106, each switch being for selection of either the front gauges or back gauges to be active at the cycle step associated with the switch. Six, three-position operating mode switches 107 are provided to determine whether, at a given step in the sequence, any gauge will be used ("off" position if not; "on" position if so) and whether or not the gauge in use will be the same one and in the same location as for the previous step ("repeat" position if so). Six indicator lights 108 are provided to designate the particular step in process. Six sets of five digit thumbwheel switches 109 are provided to select the location of the active gauge from the reference for each step of the cycle. "Nixie" tubes 111 are provided for a digital readout of the actual gauge position of the active gauge during a given step, the tubes having a capacity for showing five digits corresponding to any combination which can be selected by the thumbwheel switches. It will be readily understood that the invention is not limited to these exemplary numbers of steps or digital capacities.

Several limit switches are employed in the practice of the invention. One of these LS–1 (FIGS. 1 and 5) is to be activated at the bottom of the press brake stroke. While it may be situated at any of various locations on a press brake, one is shown for convenience in FIG. 1, to be operated by ram mounted lug 112 at the bottom of the stroke. Limit switch LS–2 (FIGS. 3 and 5) is activated by the end 113 of gauge carriage 37 when the front gauges reach the retracted reference position. Limit switch LS–3 (FIG. 5) is located in the rear gauge housing in the same way as LS–2 is in the front gauge housing, and is actuated when the rear gauges reach their retracted reference position.

Figure 5:
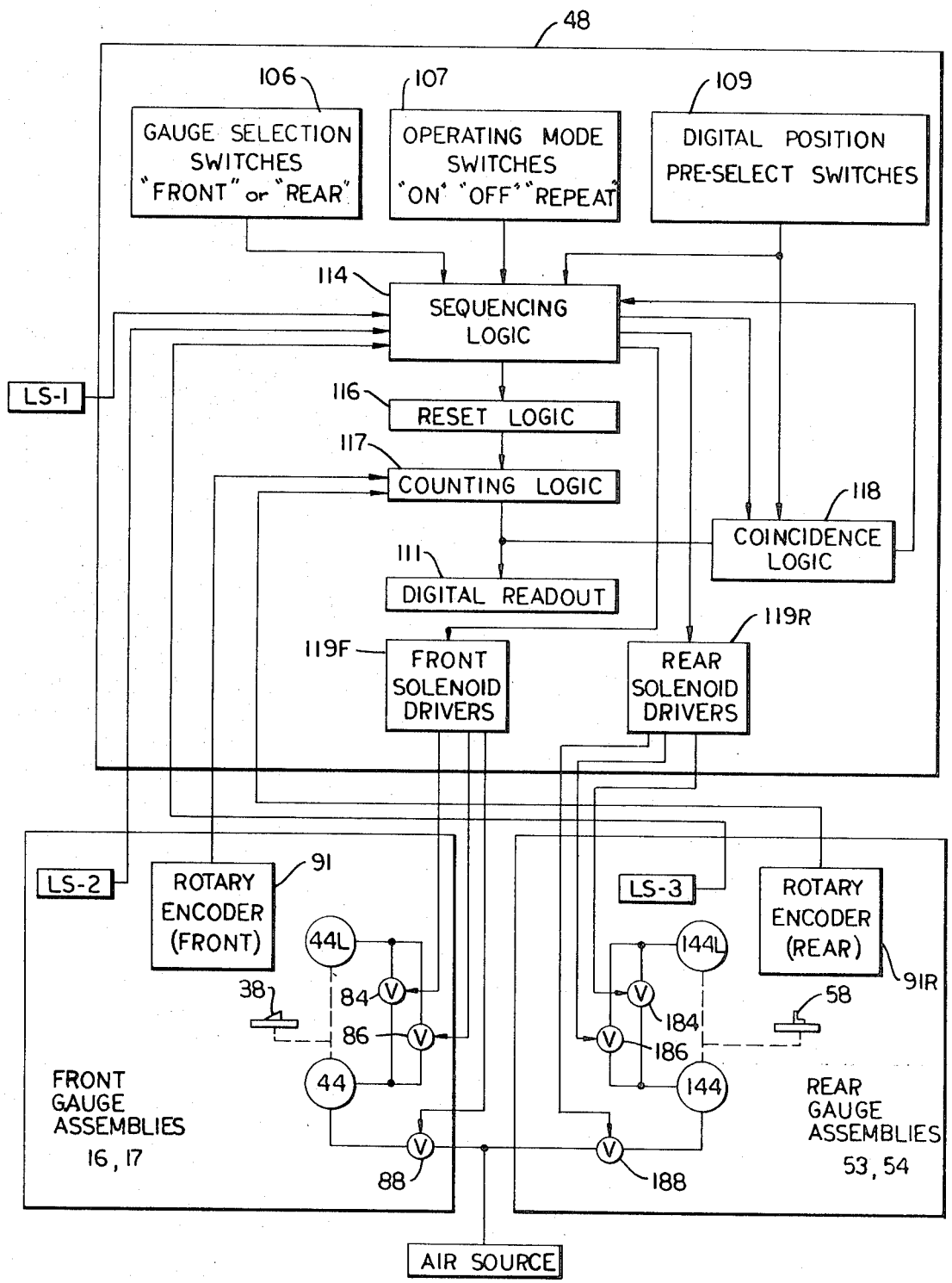
FIG. 5 is a block diagram of the system.

In operation, and referring to FIGS. 1 and 5, desired dimensions, gauge and operating mode are manually set on switches 109, 106, and 107 respectively on face of controller. At bottom of press brake stroke LS–1 is made, causing sequence logic 114 to advance to next operation (step in the part forming cycle) of controller. Depending on gauge and mode selected, the sequence logic will cause solenoid valves 84, 86, and 88 to open or remain closed. If valves 84 and 86 are opened and valve 88 is venting, the gauge in use will retract fully to its "home" or reference position, whereupon LS–2 (front) or LS–3 (rear) will be actuated. This, through the sequence logic 114 and appropriate solenoid drivers, will cause that gauge to instantly reverse (by switching valve 88 to the supply 79) or remain retracted (by closing valves 84 and 86), depending respectively upon whether or not it is next used in the sequence. As the LS–2 or LS–3 is actuated, the reset logic 116 causes the counting logic 117 to instantly reset to the particular maximum gauge travel representing "home" position. As the designated gauge advances from home toward the dimension preset for this step by the corresponding one of switches 109, the rotary encoder 91 or 91R (depending on whether it is the front or rear gauge) sends pulses to the counting logic 117 which in turn works with the coincidence logic 118 to constantly compare the moving gauge position with the desired position. At a fixed distance before coincidence is reached, one quarter inch for example, the coincidence logic (supervised by the sequencing logic) will cause, thru the appropriate solenoid driver circuit, the high speed valve 86 (for a front gauge, for example) to be closed. When final coincidence is reached the low speed valve 84 is closed, causing the gauge to stop. Gauge position, compared to pre-selected position is read on a display of the digital readout 111, "Nixie" tubes, for example.

The three banks of switches on the console can be replaced with a tape reader, if desired.

As can be seen from the foregoing, electronic digital controllers of various types can be used to determine the accurate positioning of the gauge assemblies by receiving the pulses from the rotary encoder 91 and employing these pulses in a counting logic which in turn causes the energizing or deenergizing of solenoid valves 84 and 86 to stop the hydraulic flow in line 83 and accurately position the gauges when coincidence is reached with a pre-selected gauge position indicated on the digital controller by means of either digital thumbwheel switches or a punched tape and reader normally used on tape controlled machine tools. The controller can be arranged with input of either the switches or punched tape to receive a series of gauge positions as dictated by the part being formed and cause the gauges to successively position themselves in any combination of front or rear locations as the press brake ram 12 cycles.

The gauging system is capable of sequencing as the part is formed into any combination of front or rear gauging at any required dimension within the range of the gauges. It is believed that no other system marketed today can accomplish this.

Standard commercial digital controllers of a type useful in practice of the present invention are the Dynapar digital add-subtract position indicators and controllers as made by the Dynapar Corporation in Gurnee, Ill., or the IC industrial counters similar to model 6220 made by Beckman Instruments Inc., Electronic Instruments Division in Richmond, California.

The system of the present invention may be applicable on machines other than press brakes; such as power shears, punch presses or any other device requiring automatic positioning of gauges to be coordinated with the sequencing of a machine.

The invention claimed is:

1. In a machine having tools therein and a reference line associated with said tools, gauging apparatus comprising:
a first mounting member secured to the machine;
first gauge carrier means disposed on said mounting member and movable thereon toward and away from said reference line;
first powered drive means connected to said carrier means for said movement thereof toward and away from said reference line;
first gauge means on said carrier means;
a second mounting member secured to the machine;
second gauge carrier means disposed on said second mounting member and movable thereon toward and away from said reference line;
second powered drive means connected to said second carrier means for said movement thereof toward and away from said reference line;
said first drive means including a first cylinder mounted on said first carrier means and a first piston located in said cylinder and connected to said first mounting member, with front and rear chambers in said first cylinder on opposite sides of said piston;
said second drive means including a second cylinder mounted on said second carrier means and a second piston located in said second cylinder and connected to said second mounting member, with front and rear chambers in said second cylinder on opposite sides of said piston;
first fluid supply means supplying fluid to the rear chamber of said first cylinder;
second fluid supply means supplying fluid to the front chamber of said second cylinder at a pressure below that supplied by said first supply means; and
hydraulic transfer means communicating with the front chamber of said first cylinder and the rear chamber of said second cylinder and precluding movement of one of said carrier means independent of the other of said carrier means.

2. The combination of claim 1 wherein:
said transfer means include passageway means with valve means therein controlled to permit hydraulic fluid flow first at a high rate between the front chamber of said first cylinder and the rear chamber of said second cylinder for rapid gauge advance, and then limit fluid flow to a rate lower than said high rate to limit gauge advance to an incremental rate.

3. The combination of claim 2 wherein:
said passageway means include a passageway, with said valve means including two valves disposed in parallel therein and operable in sequence.

4. In a machine having tools therein and a reference line associated with said tools, gauging apparatus comprising:
a first mounting member secured to the machine;
first gauge carrier means disposed on said mounting member and movable thereon toward and away from said reference line;
first powered drive means connected to said carrier means for said movement thereof toward and away from said reference line;
first gauge means on said carrier means;
said first drive means including a cylinder coupled to said carrier means and a piston located in said cylinder and connected to said mounting member;
means for selective application of different pressure levels on opposite sides of said piston to drive said cylinder, and thereby said carrier means, in opposite directions;
linear movement multiplying means coupling said cylinder to said carrier means and converting a certain linear movement of said cylinder to a greater linear movement of said carrier means.

5. In a machine having tools therein and a reference line associated with said tools, gauging apparatus comprising:
a first mounting member secured to the machine;
first gauge carrier means disposed on said mounting member and movable thereon toward and away from said reference line;
first powered drive means connected to said carrier means for said movement thereof toward and away from said reference line;
first gauge means on said carrier means;
said first drive means including a cylinder coupled to said carrier means and a piston located in said cylinder and connected to said mounting member;
means for selective application of different pressure levels on opposite sides of said piston to drive said cylinder, and thereby said carrier means, in opposite directions;
first and second wheels on said cylinder;
a first connector strand connected to said mounting member and connected to said carrier means and passing around said first wheel;
a second connector strand connected to said mounting member and connected to said carrier means and passing around said second wheel;
said wheels and strands driving said carrier means as said cylinder is driven, to multiply the displacement of said cylinder in transmission to said carrier means.

6. The combination of claim 5 wherein:
said wheels are sprockets and said strands are chains.

7. In a machine having a tool therein arranged to operate on the work adjacent a point during a machine operating cycle, gauging apparatus comprising:
a front gauge member and a back gauge member;
first carrier means supporting said front gauge member on said machine for movement toward and away from said point;
first drive means coupled to said first carrier means to move said front gauge member in and out from said point;
means for establishing a group of predetermined locations from said point for said gauge members to reach in a sequence;
first sensor means sensing the completion of a machine operating cycle;
second sensor means sensing the presence of said front gauge member in a reference position;
control means having inputs from said first and second sensor means and said establishing means, and having outputs to said drive means, and responsive to said inputs to operate said drive means in sychronism with the machine operating cycle;
second carrier means supporting said back gauge member on said machine for movement toward and away from said point;
second drive means coupled to said second carrier means to move asid back gauge member in and out from said point;
and third sensor means sensing the presence of said back gauge member in a reference position therefor;
gauge selector means for determining which of said gauge members is to be driven at each step of said sequence;
said control means having inputs from said third sensor means and from said gauge selector means and responsive to said inputs to operate the one of said first and second drive means corresponding to the selected gauge member for each step in said sequence.

8. The combination of claim 7 wherein:
said establishing means are groups of manually operable digital selector switches and
said gauge selector means are manually operable switches.

9. The combination of claim 7 and further comprising:
first signal generator means coupled to said front gauge member and responsive to movement of said front gauge member to produce output signals corresponding to the distance moved;
second signal generator means coupled to said back gauge member and responsive to movement thereof to produce output signals corresponding to the distance moved thereby;
counting means having inputs from said generator means and from said control means to initiate a count at each step in the sequence in response to signals from the selected one of said gauge members as the selected gauge member advances from the reference position therefor;
and coincidence means coupled to said establishing means and to said counting means to produce an output in response to attainment by said counter of a count corresponding to the predetermined location set by said establishing means for the one of said gauge members selected for the particular step in said sequence.

10. The combination of claim 9 wherein:
said first drive means include first fluid operated linear actuators coupled to said machine and to said first carrier means to drive said first carrier means toward and away from said point; and
said second drive means include second fluid operated linear actuators coupled to said machine and to said second carrier means to drive said second carrier means toward and away from said point.

11. The combination of claim 10 wherein:
said machine is a press brake, and said drive means include travel multiplier means coupled between said actuators and said carrier means.

12. In a machine having tools therein and a reference line associated with said tools, gauging apparatus comprising:
a first mounting member secured to the machine;
first gauge carrier means disposed on said mounting member and movable thereon toward and away from said reference line;
first powered drive means connected to said carrier means for said movement thereof toward and away from said reference line;
first gauge means on said carrier means;
a second mounting member secured to said machine;
second gauge carrier means disposed on said second mounting member and movable thereon toward and away from said reference line;
second powered drive means connected to said second carrier means for said movement thereof toward and away from said reference line;
said first drive means including a first cylinder coupled to said first carrier means, and a first piston located in said cylinder and connected to said first mounting member, with front and rear chamber in said first cylinder on said opposite sides of said piston;
said second drive means including a second cylinder coupled to said second carrier means and a second piston located in said second cylinder and connected to said second mounting member, with front and rear chambers in said second cylinder on opposite sides of said piston therein;
and hydraulic means communicating with front chamber of said first cylinder and the rear chamber of said second cylinder and preventing movement of one of said carrier means independent of the other of said carrier means.

13. The combination of claim 12 wherein:
said hydraulic means include passageway means with valve means therein controlled to permit hydraulic fluid flow first at a high rate between the front chamber of said first cylinder and the rear chamber of said second cylinder for rapid gauge advance, and then limit fluid flow to a rate lower than said high rate to limit gauge advance to an incremental rate.

14. The combination of claim 13 wherein:
said passageway means include a passageway, with said valve means including two valves disposed in parellel therein and operable in sequence.

15. A positioning system comprising:
a first mounting member;
first carrier means disposed on said mounting member and movable thereon toward and away from a reference line;
first powered drive means connected to said carrier means for said movement thereof toward and away from said reference line, said first drive means including a first cylinder coupled to said first carrier means, and a first piston located in said cylinder and connected to said first mounting member, with front and rear chambers in said first cylinder on opposite sides of said piston;
a second mounting member;
second carrier means disposed of said second mounting member and movable thereon toward and away from said reference line;
second powered drive means connected to said second carrier means for movement thereof toward and away from said reference line, said second drive means including a second cylinder coupled to said second carrier means, and a second piston located in said second cylinder and connected to said second mounting member, with front and rear chambers in said second cylinder on opposite sides of said piston therein;
and hydraulic control means communicating with the front chamber of said first cylinder and the rear chamber of said second cylinder and preventing movement of one of said carrier means independent of the other of said carrier means.

16. The combination of claim 15 wherein:
said control means include passageway means with valve means therein controlled to permit hydraulic fluid flow first at a high rate between the front chamber of said first cylinder and the rear chamber of said second cylinder for rapid movement of said carrier means, and then limit fluid flow to a rate lower than said high rate, to limit carrier means movement to an incremental rate.

17. The combination of claim 16 wherein:
said passageway means include a passageway, with said valve means including two valves disposed in parallel therein and operable in sequence.

18. An automatic gauging system comprising:
guage means;
powered drive means including at least two cylinder means coupled to said gauge means, said cylinder means having piston rods and cylinders for containing air and for containing hydraulic fluid, with two of said cylinders for air being spaced apart;
a source of air coupled to at least one of said cylinders for containing air to cause said cylinder means and thereby said drive means to move said gauge means with respect to a reference line;
and hydraulic control means coupled to said cylinder means to establish a slave relationship between the said spaced apart cylinders for movement thereof in unison.

References Cited
UNITED STATES PATENTS

| | | | |
|---|---|---|---|
| 3,347,043 | 10/1967 | Freese | 60—54.5 |
| 3,100,965 | 8/1963 | Blackburn | 60—54.5 |
| 3,282,049 | 11/1966 | Benton | 60—54.5 |
| 3,245,556 | 4/1966 | Thumin | 83—71 |
| 2,507,452 | 5/1950 | Moore | 83—207 |
| 2,069,536 | 2/1937 | Palmer | 83—393 |
| 2,176,512 | 10/1939 | Schwarcz | 214—1.6 |
| 3,176,556 | 4/1965 | Roberts et al. | 83—71 |

CHARLES W. LANHAM, Primary Examiner

M. J. KEENAN, Assistant Examiner

U.S. Cl. X.R.

72—7, 22, 24, 36, DIG. 21; 83—71, 529

UNITED STATES PATENT OFFICE
CERTIFICATE OF CORRECTION

Patent No. 3,618,349                    Dated November 9, 1971

Inventor(s) Gerald V. Roch

It is certified that error appears in the above-identified patent and that said Letters Patent are hereby corrected as shown below:

Column 1, line 53, "operating the back of" should be --operating the back gauge of--

Column 3, line 36, "thereor" should be --therefor--

Column 3, line 39, "herein" should be --therein--

Column 3, line 52, "starnd" should be --strand--

Column 3, line 58, "gauge travel" should be --gauge carriage travel--

Column 3, line 64, "mouned" should be --mounted--

Column 10, line 31, "guage" should be --gauge--.

Signed and sealed this 2nd day of May 1972.

(SEAL)
Attest:

EDWARD M. FLETCHER, JR.              ROBERT GOTTSCHALK
Attesting Officer                     Commissioner of Patents